US011296947B2

(12) United States Patent
Galchenko et al.

(10) Patent No.: US 11,296,947 B2
(45) Date of Patent: Apr. 5, 2022

(54) SD-WAN DEVICE, SYSTEM, AND NETWORK

(71) Applicant: Star2Star Communications, LLC, Sarasota, FL (US)

(72) Inventors: Sergey Galchenko, Aurora, OH (US); Norman A Worthington, III, Sarasota, FL (US)

(73) Assignee: Star2Star Communications, LLC, Sarasota, FL (US)

( * ) Notice: Subject to any disclaimer, the term of this patent is extended or adjusted under 35 U.S.C. 154(b) by 92 days.

(21) Appl. No.: 16/914,595

(22) Filed: Jun. 29, 2020

(65) Prior Publication Data

US 2021/0409275 A1 Dec. 30, 2021

(51) Int. Cl.
| | | |
|---|---|---|
| *H04L 12/24* | (2006.01) | |
| *H04L 12/26* | (2006.01) | |
| *H04L 12/813* | (2013.01) | |
| *H04L 29/06* | (2006.01) | |
| *H04L 41/0893* | (2022.01) | |
| *H04L 43/16* | (2022.01) | |
| *H04L 43/062* | (2022.01) | |

(Continued)

(52) U.S. Cl.
CPC ........ *H04L 41/0893* (2013.01); *H04L 43/062* (2013.01); *H04L 43/0876* (2013.01); *H04L 43/12* (2013.01); *H04L 43/16* (2013.01); *H04L 47/20* (2013.01); *H04L 63/20* (2013.01)

(58) Field of Classification Search
CPC .............. H04L 41/0893; H04L 43/062; H04L 43/0876; H04L 43/12; H04L 43/16; H04L 47/20; H04L 63/20
See application file for complete search history.

(56) References Cited

U.S. PATENT DOCUMENTS

| | | |
|---|---|---|
| 10,673,781 B2 | 6/2020 | Marichetty et al. |
| 10,680,897 B2 | 6/2020 | Smith |

(Continued)

FOREIGN PATENT DOCUMENTS

| | | |
|---|---|---|
| CN | 108173718 | 6/2018 |
| CN | 108449265 | 8/2018 |

(Continued)

*Primary Examiner* — Philip J Chea
*Assistant Examiner* — Hassan A Khan
(74) *Attorney, Agent, or Firm* — Endurance Law Group PLC

(57) ABSTRACT

The present invention relates to a software defined networking in a wide area network (SD-WAN) device, comprising a network monitor which observes and gathers network parameters reflecting network conditions and stores them to a database; a metrics collector which receives and gathers node parameters reflecting node status stores them to the database, a traffic manager which performs a traffic evaluation on the network parameters or node parameters to identify if a network traffic level is within a performance range, and a policy engine which performs a mitigation evaluation on the analysis done by the traffic manager to determine if a mitigation strategy must be initiated. If a mitigation strategy must be initiated, the policy engine determines a target node to receive the mitigation strategy and translates the mitigation strategy into a format understandable to the target node and pushes a mitigation command containing the mitigation strategy to the target node.

47 Claims, 4 Drawing Sheets

(51) Int. Cl.
*H04L 47/20* (2022.01)
*H04L 43/12* (2022.01)
*H04L 43/0876* (2022.01)

(56) References Cited

U.S. PATENT DOCUMENTS

| | | | |
|---|---|---|---|
| 10,681,131 B2 | 6/2020 | Tumuluru | |
| 10,693,775 B2 | 6/2020 | Bajaj et al. | |
| 10,700,982 B2 | 6/2020 | Bajaj | |
| 10,708,144 B2 | 7/2020 | Mohan et al. | |
| 10,708,196 B2 | 7/2020 | Kodavanty | |
| 10,708,225 B2 | 7/2020 | Gopalasetty et al. | |
| 10,708,382 B2 | 7/2020 | Chauhan et al. | |
| 10,715,427 B2 | 7/2020 | Raj et al. | |
| 10,721,165 B2 | 7/2020 | Evans et al. | |
| 10,735,217 B2 | 8/2020 | Ashtaputre et al. | |
| 10,742,726 B2 | 8/2020 | Vysotsky et al. | |
| 10,743,248 B2 | 8/2020 | Davies et al. | |
| 10,749,785 B1 | 8/2020 | Thangavel et al. | |
| 10,749,787 B2 | 8/2020 | Dhanabalan | |
| 10,749,795 B2 | 8/2020 | Shelar | |
| 10,764,193 B2 | 9/2020 | Chunduru Venkata et al. | |
| 10,771,375 B2 | 9/2020 | Shah et al. | |
| 10,771,382 B2 | 9/2020 | Bajaj et al. | |
| 10,771,394 B2 | 9/2020 | Hughes | |
| 10,783,093 B2 | 9/2020 | Dall et al. | |
| 10,785,103 B2 | 9/2020 | Prabhu et al. | |
| 10,785,190 B2 | 9/2020 | Saavedra et al. | |
| 10,785,634 B1 | 9/2020 | Fiorese et al. | |
| 2019/0052558 A1 | 2/2019 | Mehta et al. | |
| 2019/0081959 A1* | 3/2019 | Yadav | H04L 63/1425 |
| 2019/0207844 A1 | 7/2019 | Kodavanty et al. | |
| 2019/0268973 A1 | 8/2019 | Bull et al. | |
| 2020/0012796 A1* | 1/2020 | Trepagnier | G06N 3/08 |
| 2020/0067831 A1 | 2/2020 | Spraggins et al. | |
| 2020/0195557 A1 | 6/2020 | Duan et al. | |
| 2020/0204452 A1 | 6/2020 | Bhat et al. | |
| 2020/0274772 A1 | 8/2020 | A et al. | |
| 2020/0274794 A1 | 8/2020 | Zhang et al. | |
| 2020/0274912 A1 | 8/2020 | Momchilov et al. | |
| 2020/0275281 A1 | 8/2020 | Bordeleau et al. | |
| 2020/0275357 A1 | 8/2020 | Bordeleau et al. | |
| 2020/0275358 A1 | 8/2020 | Bordeleau et al. | |
| 2020/0275359 A1 | 8/2020 | Bordeleau et al. | |
| 2020/0275360 A1 | 8/2020 | Bordeleau et al. | |
| 2020/0278892 A1 | 9/2020 | Nainar et al. | |
| 2020/0278935 A1 | 9/2020 | Borikar et al. | |
| 2020/0287819 A1 | 9/2020 | Theogaraj et al. | |
| 2020/0287894 A1 | 9/2020 | Leon | |
| 2020/0287976 A1 | 9/2020 | Theogaraj et al. | |
| 2020/0288296 A1 | 9/2020 | Fiorese et al. | |
| 2020/0288516 A1 | 9/2020 | Elbaz et al. | |
| 2020/0295984 A1 | 9/2020 | Qian et al. | |
| 2020/0296000 A1 | 9/2020 | Smith | |
| 2020/0296007 A1 | 9/2020 | Finn, II et al. | |
| 2020/0296011 A1 | 9/2020 | Jain et al. | |
| 2020/0296012 A1 | 9/2020 | Paruchuri et al. | |
| 2020/0296023 A1 | 9/2020 | Kumar et al. | |
| 2020/0296026 A1 | 9/2020 | Michael et al. | |
| 2020/0296029 A1 | 9/2020 | Shenoy | |
| 2020/0304411 A1 | 9/2020 | Tang et al. | |
| 2020/0304606 A1 | 9/2020 | Tourrilhes et al. | |
| 2021/0021628 A1* | 1/2021 | Sbandi | H04L 63/1441 |

FOREIGN PATENT DOCUMENTS

| | | |
|---|---|---|
| CN | 108566341 | 9/2018 |
| CN | 108713309 | 10/2018 |
| CN | 108833548 | 11/2018 |
| CN | 109743370 | 5/2019 |
| CN | 109918109 | 6/2019 |
| CN | 110290093 | 9/2019 |
| CN | 110611658 | 12/2019 |
| CN | 110769067 | 2/2020 |
| CN | 210405347 | 4/2020 |
| CN | 111130858 | 5/2020 |
| CN | 111130885 | 5/2020 |
| CN | 210469607 | 5/2020 |
| CN | 210469615 | 5/2020 |
| WO | PCT/EP2017/084854 | 12/2017 |
| WO | PCT/US2019/017960 | 2/2019 |
| WO | PCT/US2019/044435 | 7/2019 |
| WO | PCT/US2019/056960 | 10/2019 |

* cited by examiner

SD-WAN DEVICE, SYSTEM, AND NETWORK

FIELD OF THE INVENTION

The present devices, systems, and methods generally relate to software-defined networking in a wide area network, particularly to devices, systems, subsystems, and methods to provide configuration, operation, business logic, monitoring, reporting, and management services to operate a lifecycle of software-defined networking in a wide area network as a service.

BACKGROUND OF THE INVENTION

"Software defined networking in a wide area network" or "SD-WAN" services and devices comprise a network management approach that enables dynamic, programmatically efficient configuration to improve network performance, having a more similar composition to "cloud computing" than traditional "network management." In cloud computing, data and computing power can be stored and shared over several end user devices in various locations, each and all served from a central computing data center or server. SD-WAN services and devices, commonly, centralize network management tools in one network device, disassociating routing of a data flow from the contents of the data flow, otherwise generally separating the functionality of what to do with packets arriving on an inbound interface from drawing the network topology, or the information in a routing table that defines what to do with incoming packets.

Thereby, SD-WAN services and devices may simplify the management and operations of a network by decoupling the network hardware from their control mechanism, in one example, replacing traditional branch routers with "virtualization appliances" that can control applications and offer some form of network overlay. The open flow protocol commonly used in such SD-WAN services and devices enables network controllers and administrators to determine the path of network packets across a monitored network of switches, allowing switches from different vendors to be managed remotely from the SD-WAN services and devices using the single, open protocol.

In general, SD-WAN services and devices support multiple connection types, such as, by way of example, multi-protocol label switching (MPLS), frame relay, and long-term evolution (LTE) wireless. The services and devices may also optionally execute dynamic path selection, for load sharing and resiliency. Furthermore, these SD-WAN services devices often commonly offer an end user interface that can be configured and managed at an end user device level, and may also support virtual private networks (VPNs) and third-party services like firewalls. Frequently, SD-WAN services and devices are available to an end user via pre-configured, specialty appliances that sit on the edge of an end user's local network, in addition to any other computing and network devices, to reduce lag time for its useful functionality further. The addition of computing appliances at the edge of a user's network, however, may cause unnecessary bandwidth interruption and delay due to routing or network conditions and events, especially in the case of poor configuration and setup. Such devices may provide improved network performance within communication nodes, which it can monitor, however, monitoring may be limited due to constraints on the local network, as dictated by the Internet service provider (ISP), or other limiting factors.

Therefore, a reliable device, system, and method are needed to be able to offer SD-WAN services and devices remotely (i.e., via a network connection) instead of via a specialty appliance, to provide such services and devices through existing network architecture at an end-user location, without the need for additional on-site appliances.

SUMMARY OF THE INVENTION

It is, therefore, an object of the present invention to provide a novel software defined networking in a wide area network (SD-WAN) device, a system further including the novel SD-WAN device, and methods for evaluation using such device, independently and as part of such system.

The present invention may optionally operate within several communications and network environments, for example, but in no way limited to, the public Internet, a private Internet or Intranet, a network on one side of a third-party provided address family translation or network address translation (NAT) implementation, a network on a second side of a third-party provided NAT implementation, a data transport network or a series of networks, a communications network or series of networks, a non-optimized communications network or series of networks, an optimized communications network or series of networks, and the like.

In one exemplary embodiment, an SD-WAN device is provided. The SD-WAN device can further comprise a network monitor, a metrics collector, a traffic manager, a policy engine, and a controller.

In one exemplary aspect, the network monitor can observe and can gather, via a network, a network parameter reflecting a network condition. The network monitor can thereafter store the network parameter to a database.

In another exemplary aspect, the metrics collector can receive and can gather, via the network, a node parameter reflecting a status of at least one node operatively coupled to the network. The metrics collector can thereafter store the node parameter to the database.

In an additional exemplary aspect, the traffic manager can perform a traffic evaluation on the network parameter or the node parameter to identify if a network traffic level is within a performance range, creating an analysis.

In yet another exemplary aspect, the policy engine can perform a mitigation evaluation on the analysis to determine if a mitigation strategy must be initiated. As contemplated as an element of the inventive concept, if the policy engine determines that a mitigation strategy must be initiated, the policy engine can determine a target node to receive the at least one mitigation strategy. It can translate the at least one mitigation strategy into a format understandable to the target node. The policy engine can, thereafter, push a mitigation command containing the translated mitigation strategy(ies) to the target node.

In yet still another exemplary aspect, the controller can further comprise an operating system and a coupler. The operating system can direct and control the operation and function of the SD-WAN device and the coupler can operatively couple the network monitor, the metrics collector, the traffic manager, the policy engine, the database, and the operating system.

The following are either or both additional and exemplary aspects of the present exemplary embodiment, one or more of which can be combined with the basic inventive SD-WAN device embodied above:

the network parameter can reflect the network condition or a network event;

the network parameter can reflect the network condition and a network event;

the metrics collector can receive and can gather the node parameter via a tunnel between a gateway cluster and the node;

the node parameter can reflect the status of the node or a node event;

the node parameter can reflect the status of the node and a node event;

the traffic manager can perform the traffic evaluation on the network parameter and the node parameter;

the traffic evaluation can further comprise applying a business rule relating to a service factor or a network factor constraining a maximum traffic level and a minimum traffic level which can be required to maintain a network configuration at its current status;

the traffic evaluation can further comprise applying a business rule relating to a service factor and a network factor constraining a maximum traffic level and a minimum traffic level required to maintain a network configuration at its current status;

the network traffic level can further comprise at least one of a bandwidth requirement, a maximum tolerable packet loss rate, a maximum of active nodes simultaneously engaged in the network, a maximum tolerable delay, a maximum tolerable jitter, or a minimum video frame rate;

the network traffic level can further comprise a bandwidth requirement, a maximum tolerable packet loss rate, a maximum of active nodes simultaneously engaged in the network, a maximum tolerable delay, a maximum tolerable jitter, and a minimum video frame rate;

the performance range can further comprise a forecasted traffic graph;

the performance range can further comprise a real-time traffic graph;

the analysis can further comprise the traffic evaluation of the network parameter or the node parameter;

the analysis can further comprise the traffic evaluation of the network parameter and the node parameter;

the mitigation evaluation can further comprise evaluating a list of available mitigation strategies and determining from it a list of eligible mitigation strategies;

the mitigation evaluation can further comprise evaluating a list of available mitigation strategies and determining from it a list of eligible mitigation strategies and evaluating the list of eligible mitigation strategies based on a cost and the node parameter;

the mitigation strategy can further comprise an array of actions to be translated if the mitigation strategy is selected;

if the policy engine determines that the mitigation strategy must be initiated, the target node is the node; and if the policy engine determines that the mitigation strategy must be initiated, the target node is a second node.

In another exemplary embodiment, a system including the SD-WAN device is provided. The system further comprises at least one gateway and at least one node, and demonstrates the "software defined networking in a wide area network," as stated above.

In another exemplary embodiment, methods for mitigation evaluation via a policy engine of a software defined networking in a wide area network (SD-WAN) device are provided. Such exemplary methods combine the basic inventive concept(s) as embodied in the above exemplary SD-WAN device and exemplary system.

In one aspect of this exemplary method, the policy engine can engage in evaluating an analysis created by a traffic manager to determine whether a mitigation strategy is required for a target node.

In another aspect of this exemplary method, the policy engine can engage in comparing one or more of a currently utilized resource within a network to which the policy engine is operatively coupled to determine as a threshold mitigation strategy if a rollback of the one or more currently utilized resource will fully satisfy the evaluation of the analysis.

In yet another aspect of this exemplary method, the policy engine can engage in retrieving from a database a list of available mitigation strategies where the rollback of the one or more currently utilized resources does not satisfy the evaluation of the analysis.

In still another aspect of this exemplary method, the policy engine can engage in evaluating the list of available mitigation strategies based on a network parameter, to determine a list of eligible mitigation strategies and to determine a cost.

In yet still another aspect of this exemplary method, the policy engine can further engage in evaluating the list of eligible mitigation strategies based on the cost, the network parameter, and a node parameter to create a priority list, whereby the priority list is prioritized by a lowest cost and a highest impact on the network parameter or the node parameter.

In yet a further aspect of this exemplary method, the policy engine can engage in selecting from the priority list an at least one initiated mitigation strategy having a highest priority.

The following are either or both additional and exemplary aspects of the present exemplary method, one or more of which can be combined with the basic inventive method embodied above:

evaluating the analysis to determine if a mitigation strategy is required can be based on the policy engine evaluating a network parameter or a node parameter;

evaluating the analysis to determine if a mitigation strategy is required can be based on the policy engine evaluating a network parameter and a node parameter;

the network parameter can reflect an at least one network condition or an at least one network event;

the node parameter can reflect a node status or a node event;

determining a list of eligible mitigation strategies can be based on evaluating the list of available mitigation strategies to determine a cost and can be based on a network parameter or a node parameter;

determining a list of eligible mitigation strategies can be based on evaluating the list of available mitigation strategies to determine a cost and can be based on a network parameter and a node parameter;

the priority list can be prioritized by a proprietary learning algorithm which can determine the cost based on a pattern of behavior in a network and can reevaluate a network parameter and the one node parameter based on the pattern of behavior in the network; and selecting from the priority list can be based on a proprietary learning algorithm determining a highest priority based on a pattern of behavior in the network.

These and other exemplary aspects of the present basic inventive concept are described below. Those skilled in the art will recognize still other aspects of the present invention upon reading the included detailed description.

DETAILED DESCRIPTION OF THE DRAWINGS

The present invention is illustrated by way of example, and not limitation, in the figures depicted in the following drawings.

FIG. 1 an exemplary "communications environment" in which an exemplary embodiment of the present invention may operate.

DETAILED DESCRIPTION OF THE INVENTION

Figure 1:
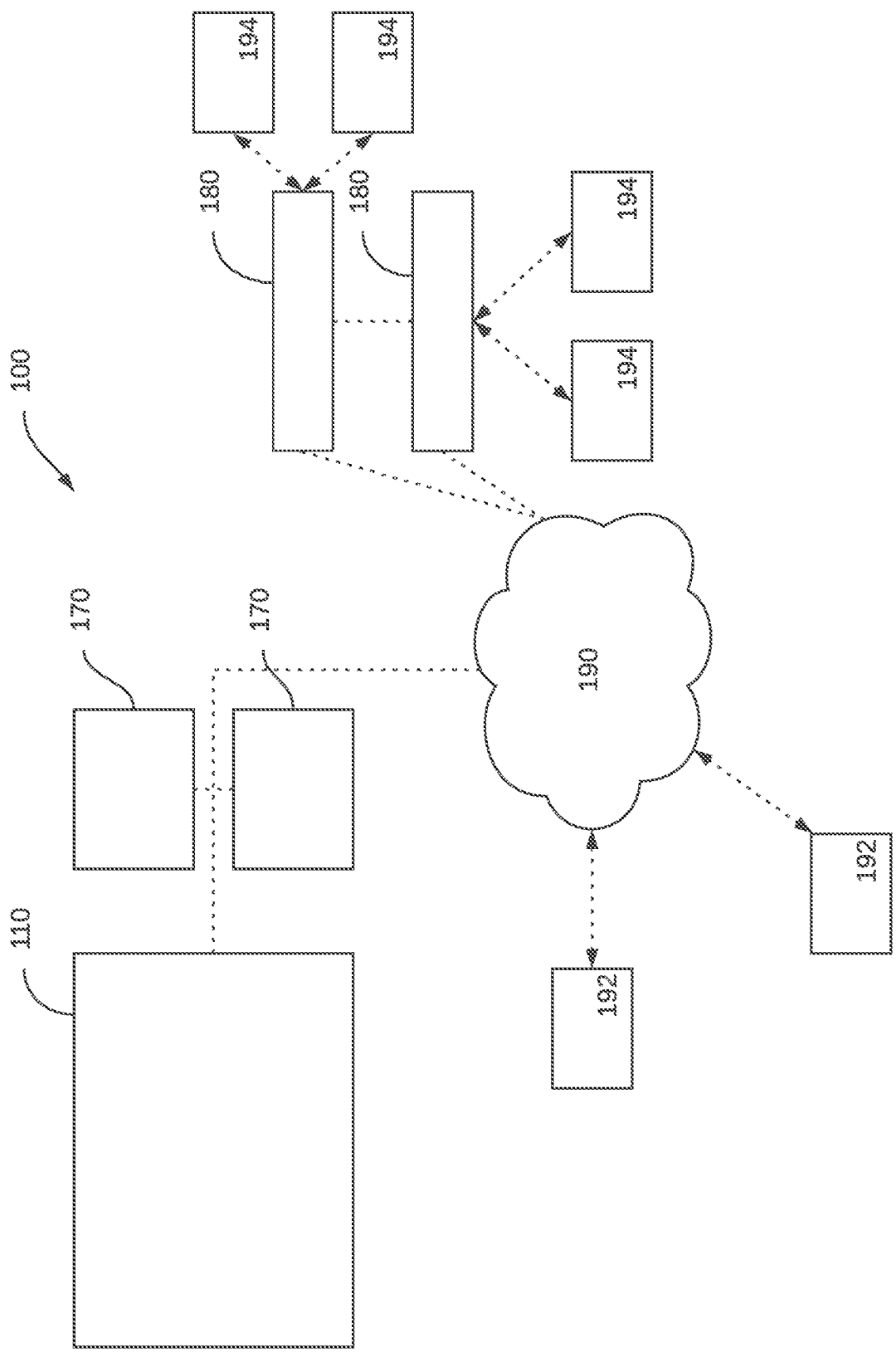

The present invention will now be described more fully herein with reference to the accompanying drawings, which form a part of, and which show, by way of illustration, specific exemplary embodiments through which the invention may be practiced. This invention may, however, be embodied in many different forms and should not be construed as limited to the exemplary embodiments set forth below. Rather, these exemplary embodiments are provided so that this disclosure will be thorough and complete, and will fully convey the scope of the invention to those skilled in the art. Among other things, the present invention may be embodied as devices, systems, and methods. Accordingly, various exemplary embodiments may take the form of entirely hardware embodiments, entirely software embodiments, and embodiments combining software and hardware aspects. The following detailed description is, therefore, not to be taken in a limiting sense.

In the present field of its invention, this invention generally relates to software-defined networking in a wide area network, particularly to devices, systems, subsystems, and methods to provide configuration, operation, business logic, monitoring, reporting, and management services to operate a lifecycle of software-defined networking in a wide area network as a service. Generally, in computing and communications networks, configuration refers to an arrangement of systems (i.e., computing and communications systems) of functional units based on nature, number, characteristics, and the like, and can include any combination of hardware computing units and software computing units, as considered by those skilled in the art. Configuration affects both the function and performance of computing and communications systems. Operation, or operations systems support, likewise, is generally defined as support management functions, including but not limited to network inventory, service provisioning, network configuration, fault management, and the like, which a network or communications system service can use to manage its networks.

Business logic, on the other hand, relates to software and hardware programming that encodes real-world business rules, which would allow a system and device to determine how data can be created, stored, and changed. Business logic often comprises workflows, otherwise described as ordered tasks of passing data (i.e., audio, visual, or materials such as documents, messages, and the like), from one participant, in certain embodiments persons and software, to another. Monitoring and reporting are frequently implementations of business logic. Monitoring comprises measuring network or system metrics for response time, availability, uptime, and the like. Reporting, in a similar manner, can comprise aggregated or combinations of data as collected by a monitor, which reflects trends and statistics of current activity within a system or network.

Management services frequently comprise the performance of policies and processes to design, plan, deliver, operationalize, control information, and the like, specifically for the benefit of and at the direction of the end-users of the network or system. Management services often commonly including any one or more, in any combination, of configuration, operation, business logic, monitoring, and reporting, as described in more detail throughout this specification and the claims.

Throughout this specification and claims, the following terms take the meanings explicitly associated herein, unless the context dictates otherwise. The phrases "in one embodiment" and "this exemplary embodiment" do not necessarily refer to the same embodiment, though they may. Furthermore, the phrases "in another embodiment," "additional embodiments," and "further embodiments" do not necessarily refer each or collectively to a different embodiment, although they may. As described below, various embodiments of the invention may be readily combined, without departing from the scope or spirit of the invention.

Also, throughout this specification, the following terms and phrases are dispensed with, unless the context dictates others. The phrases "at least one of," "one or more," "one of," more than one," and "a plurality of" as those phrases are commonly interpreted as a part of the written description interpretation and claim construction guidelines as stated in the Manual of Patent Examining Procedure in Section 2163, as written herein, should not be considered limiting or inclusive. Their collective meaning should encompass the various definitions embodied by each, collectively, meaning a reference to a single element or a plurality of elements comprises, "at least one of," "one or more," "one of," "more than one," and "a plurality of."

Also, the term "or" is an inclusive "or" operator and is equivalent to the term "and/or" unless the context dictates otherwise. The term "based on" is not exclusive and allows for being based on additional factors not described, unless the context dictates otherwise. In addition, throughout the specification, the meaning of "a," "an," and "the" include plural references. The meaning of "in" includes "in" and "on."

The following briefly describes one of the exemplary embodiments of the present invention to provide a basic understanding of some aspects of the invention. This brief description is not intended as an extensive overview, nor is it intended to identify key or critical elements, to delineate, or otherwise narrow the scope. Its purpose is to present concepts in a simplified form as a prelude to a more detailed description, which is presented later. The present invention, generally, is directed towards a hardware computing solution which comprises coupled, distinct computing infrastructure components associated with evaluating and updating data communications traffic policies and configurations at communication nodes based on collected metrics, network conditions, network events, and the like, in one non-limiting example, to switch a data flow from one circuit to another, otherwise referred to herein as an implementation of a "mitigation strategy."

Figure 2:
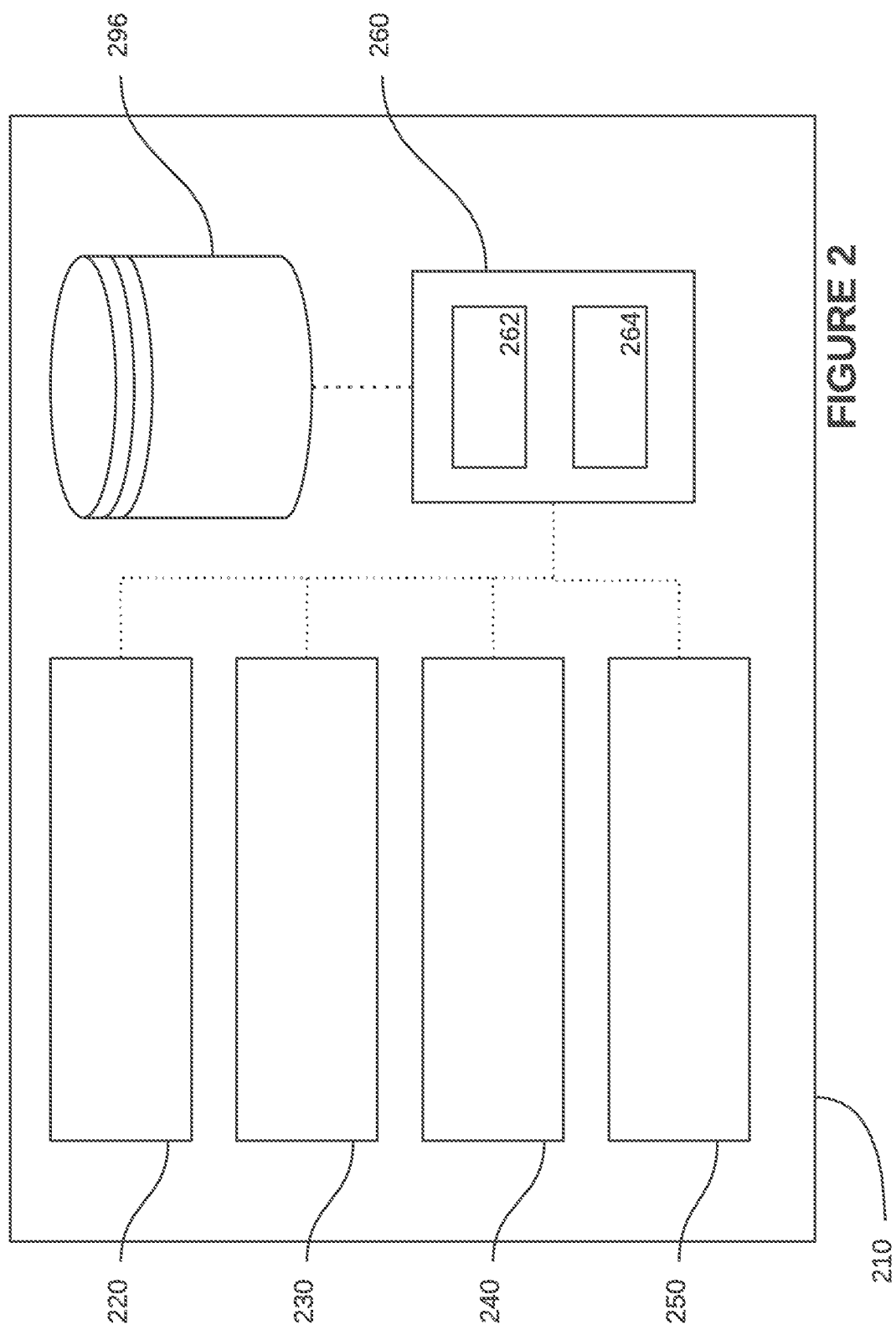
FIG. 2 illustrates an exemplary embodiment of the present invention, an exemplary software defined networking in a wide area network (SD-WAN) device.
Figure 3:
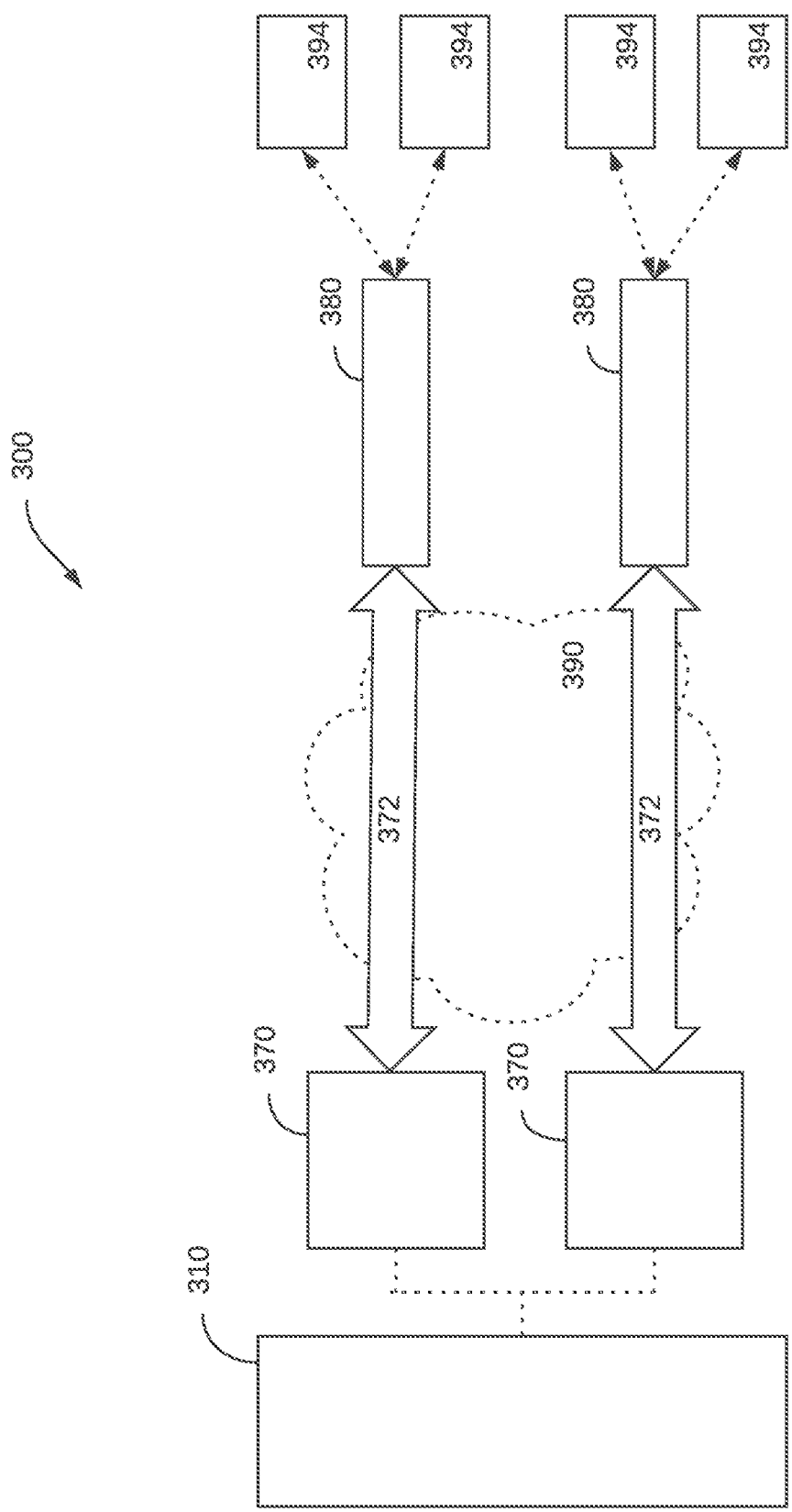
FIG. 3 illustrates another exemplary embodiment of the present invention, a system within which an SD-WAN device may operate.
Figure 4:
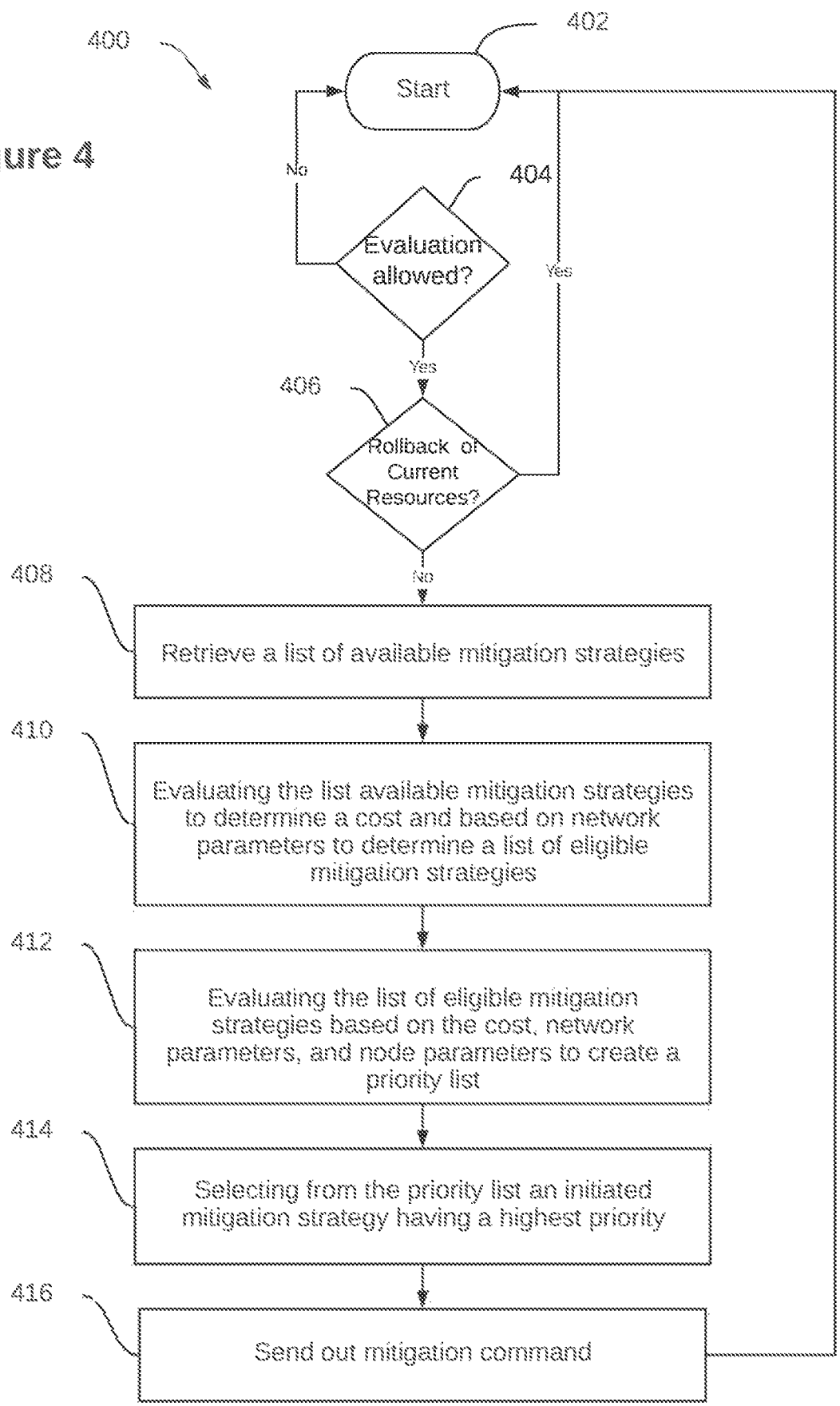
FIG. 4 illustrates one exemplary aspect of the present invention, an exemplary method for evaluating network events and other criteria implementing the SD-WAN device.

Below, exemplary embodiments will be provided in conjunction with the attached drawings. The written description below will begin with reference to FIG. 1 and will include a high-level, generalized description of a "communication system" in which the present invention can be practiced. FIGS. 2 through 4 thereafter will discuss various aspects and embodiments of the present invention in more detail.

FIG. 1 illustrates an embodiment of a communication system 100, which is an exemplary environment in which the present inventive concept and its individual elements can be practiced, constructed, and operated, in whole, in part, and any order or combination. Communication system 100 includes an exemplary communication server 110, exemplary gateways 170, exemplary communication nodes 180, and exemplary networks 190. Communication system 100, generally, involves the connection of the various elements and components described herein for the transmission of communication sessions via electronic transfer of data over one or more third-party networks (i.e., networks 190), which generally includes transfer through a series of gateways (i.e., gateways 170) and communication nodes (i.e., communication nodes 180). A communication session generally comprises data packets (either or both signaling and data packets) passed using a communication protocol and generally relating to one or more of the following non-exhaustive application types: audio only; audio and video; audio and data; or any combination of audio, video, and data over a digital medium. One knowledgeable in the art should understand that the phrase "communication session" is generally synonymous with the term "connection." As such, it should be realized that one exemplary embodiment of communication system 100, can include, but is not limited to, an Internet protocol (IP)-based communication system architecture that provides one or more end users with an end-to-end, fully managed and monitored system for transporting audio, video, and other data traffic over third party networks.

As illustrated, communication system 100 comprises several components in addition to communication server 110, gateways 170, communication nodes 180, networks 190, for example, endpoints 192 (each individually an endpoint 192 or collectively endpoints 192) for either or both initiating and receiving communication sessions (i.e., both incoming and outgoing) connected directly via networks 190 as well as endpoints 194 (each individually an endpoint 194 or collectively endpoints 194) for either or both initiating and receiving communication sessions (i.e., both incoming and outgoing) connected to networks 190 via communication nodes 180. Within this exemplary embodiment, communication sessions may be between the illustrated endpoints 192, between endpoints 192 and endpoints 194, as well as between endpoints 192, 194, and other endpoints not shown. It should be understood that a communication session between endpoints 192, 194, and endpoints not shown can be, for example, in a two-party manner, or can involve other endpoints (also not shown) in a multi-party manner, such as, in a multi-endpoint (i.e., multi-user) communication session. In this exemplary embodiment, as shown in FIG. 1, communication sessions sent or received from endpoints 192 can be managed and operated by a communication server 110, whether or not endpoints 192, 194 are geographically distributed. Also, it will be understood that in alternate embodiments, the endpoints 192, 194 are not limited by connection to a traditional switched telephone network or "PSTN" or other traditional systems. For example, in such embodiments, endpoints 192 are connected directly to a network, such as networks 190.

Communication sessions involving endpoints 192, 194 occur via networks 190 and are typically associated with one or more of the following, byway of example and not limitation, a web-deployed service with client/service architecture, a cellular data network, a cloud-based system, secure data networks, and gateways/firewalls that provide information security, and the like. Moreover, as will be understood and appreciated, various networking components such as routers, switches, hubs, and the like, are generally also involved in transmitting communication sessions, but not illustrated for simplicity purposes.

Endpoints 192, 194, generally are defined as electrical or electronic equipment that can be connected to an IT infrastructure, and that can enable electronic communications (e.g., communication sessions). For example and in no way in limitation, endpoints 192, 194 may comprise any singular or combination of a VoIP phone, a mobile phone, a fax machine, a conventional Plain Old Telephony System (POTS) phone, a smart phone, a cordless phone, a conference room speakerphone, a computer, a Bluetooth-enabled phone, a laptop, audio/video conferencing equipment, electronic gaming equipment, a tablet, a printer, or more generally, any kind of processing device which can connect to a network and to or from which an end user can operatively practice a communication function. Further, in locations, in one example, physical organizations, analog or digital overhead paging systems may be utilized. Such legacy systems (including existing communications circuits that transmit data at speeds around 1.544 megabits per second, also known as "T1" circuits or POTS trunks) can be integrated with optimizing server elements via adapters (not shown). As will be understood and appreciated, there is no limitation imposed on the number of endpoints, endpoint types, brands, vendors, and manufacturers, etc. that may be used in connection with embodiments of the present invention, or how endpoints are functionally connected to communication server 110.

In a general or traditional communications network, an outgoing (which can also be known as "placed," "sent," and in purely voice sessions, "terminating") communication session will travel from endpoint 192 via one or more networks 190, through the IP-PSTN gateways (not shown) where IP traffic is converted into telephony or data traffic and is finally delivered to endpoint 192 or another endpoint (not shown). The reverse happens for an incoming communication session (which can also be known as "received," "delivered," and in purely voice sessions "originating"). As will be discussed in reference to this FIG. 1, additional configurations of communication traffic will be illustrated, for example, generated via endpoints (not shown), and passed from communication nodes 180 via networks 190 and thereafter routed through gateways 170 and communication server 110. In one example, incoming traffic may be directed to communication server no and thereafter, communication nodes 180 for eventual delivery to specific endpoints 192, 194, and the like. In an alternative example, incoming traffic may be redirected to an automated attendant, call queues, voicemail, or an off-premises device (e.g., an end user's mobile phone or home phone).

According to one embodiment, and as shown in FIG. 1, communication server no may integrally comprise one or more computing elements (not shown) while being connected with networks 190. Through these connections, as shown, communication server no can be operatively connected to one or more of the endpoints 192,194, and in additional exemplary embodiments, one or more remotely-located communication server modules (not shown). In one embodiment, communication server no monitors and collects real-time and historical network characteristics, applies organization level methodologies for specific business requirements, embodied as executable instructions stored in the form of computer-readable media related to networks 190 characteristics, evaluates various communication session routes/paths, and if necessary modify communication routes to account for the application of entity-specific requirements and real-time networks characteristics. For purposes of the claims and this specification, communication server no is further contemplated to comprise such hardware or software computing elements components as necessary to embody the SD-WAN device 210, as illustrated in more detail with reference to FIG. 2, below.

Communication server 110, as shown in FIG. 1, is intended to be any singular or collection of computing elements or communication nodes (i.e., similar in form and function to communication nodes 170) that provide a suite of hosted services to create a complete, feature-rich communication system. As such, communication server 110 may comprise any combination of computing components, by way of example, but in no way required or limited to, processing units (CPUs), mass memory, buses, RAM, ROM, and other storage means (all of which are not shown for simplicity purposes). In this exemplary embodiment, mass memory may include an example of computer-readable storage media for storing information such as computer-readable instructions, data structures, databases (such as, for example, database 296 illustrated in FIG. 2), program modules or other data, basic input/output system ("BIOS") for controlling low-level operations of communication server 110, as well as an operating system for controlling the operation of communication server 110 (such as, for example, controller 260 illustrated in FIG. 2). It should be appreciated that these components may include a general-purpose operating system such as a version of UNIX® or LINUX™, or any other operably functional operating system that comprises software to support communication server's 110 basic functions. The operating system may include, or interface with, Java virtual machine modules that enable control of either or both hardware components and operating systems operations, via Java application programs, or any other applications and systems using any other operably functional computing language.

Additional exemplary embodiments of communication server 110 can optionally include any singular or collection of computer servers or communication nodes for storing data associated with providing communication sessions, i.e., databases (such as, for example, database 296 depicted in FIG. 2) further comprising directories of information identifying characteristics relating to various communication nodes. Non-limiting examples of such directory information can include, for example, IP addresses of the respective communication nodes, a network type (i.e., which of a variety of available networks a communication is in or associated with), a codec or a set of codecs compatible with a communication node, or network, an information status of the operability of the communication type, a type of application data (i.e., audio, video, data, or any combination thereof) the respective communication node processes, and the like. Databases, in these exemplary embodiments, may, in one example, be relational, which can be defined as tabular databases with data defined so that it may be reorganized and accessed in several ways, and in another example distributed, which can be defined as dispersed or replicated databases located among different points in the networks.

As further illustrated in FIG. 1, gateways 170 are operably connected to communication server 110, via one or more networks, such as, for example, networks 190 including, but not limited to, the Internet, another public network, or a private network. Conventionally, the term gateway refers to a piece of networking hardware that can be a network or communication node equipped for interfacing with another network that uses different protocols. As such, a gateway may contain devices such as protocol translators, impedance matching devices, rate converters, fault isolators, or signal translators as necessary to provide system interoperability. Frequently gateways also require the establishment of mutually acceptable administrative procedures between the networks it services. More specifically, a protocol translation or mapping gateway may interconnect networks with different network protocol technologies by itself performing the required protocol conversions. In additional embodiments, gateways may be "virtualization appliances" or programs and applications configured to perform the tasks of a gateway. In any format, gateways optimally can operate at any network layer. Is this way, activities of a gateway are more complex than that of a traditional router or switch as it communicates using more than one protocol.

In FIG. 1, as shown, communication nodes 180 are operatively connected to communication server 110, via one or more networks, such as, for example, networks 190 including, but not limited to, the Internet, another public network, or a private network. In general, communication nodes 180 can be any type of IP-enabled device that connects to a network (such as networks 190) and enables communication sessions. Non-limiting examples of communication nodes 180 include network edge devices, PBX servers, provisioning servers, route servers, media proxy servers, statistics servers, or gateways. In one exemplary embodiment, gateways 170 and communication nodes 180 can be two virtualization appliances residing in the same computing device or two virtualization appliances located in separate computing devices that have the same or similar functionality. Other non-limiting examples of communication nodes 180 further include network-attached component devices, border controllers, and the like.

It will be further understood that the terms "network," "networks," or "networks 190" or each individually referenced as a network (i.e., "network 190") as used herein generally include any kind of computer-enabled, IP-enabled, or other digital networks for transporting data or traffic associated with communication sessions, and generally include a network in a system of interconnected computing devices, servers, nodes, or endpoints. As illustrated, networks 190, each represents a connected yet different network in a series. In one example, a network includes the Internet that is a global system of interconnected computers that use the standard IP suite to serve end users worldwide with an extensive range of information resources and services. It should also be understood that the term "Internet" as used herein and generally, in reality, is a network of networks consisting of millions of private, public, academic, business, and government networks, of local to global scope, that is linked by a broad array of electronic, wireless and optical technologies. As described in reference to this specification and the claims, gateways, and communication nodes generally connect to networks, and networks may comprise one or more gateways, communication nodes, and other network edge devices as illustrated in these exemplary embodiments, for example, gateways 170, communication nodes 180, and networks 190.

Usually, such networks are offered as commoditized services by third-party Internet service providers (ISPs) and include a plurality of one or more third-party sub-networks that are usually owned by third party network providers or third-party carriers. Such sub-networks can be hard-wired or wireless, including, but not limited to, cellular, optical fiber, Wi-Fi, WiMax®, proprietary networks, and the like, as should occur to one skilled in the art. It should also be understood by one skilled in the art that networks 190 can further include PSTN nodes such as IP-PSTN gateways (not shown) at the boundary of IP networks, which can function as a conversion between PSTN traffic and IP traffic.

FIG. 2 illustrates one exemplary embodiment of a software defined networking in a wide area network (SD-WAN) device 210. SD-WAN device 210, as shown, contains several computing or hardware processing elements, including, but not limited to, a network monitor 220, a metrics collector 230, a traffic manager 240, a policy engine 250, and a controller 260. SD-WAN device 210 can generally be considered to be any type of IP-enabled device or cluster of devices that connects to a network and enables communication sessions. As referred to herein, examples may include but are not limited to network servers, communication nodes, network edge devices, provisioning servers, route servers, media proxy servers, statistics servers, and the like. Additional examples may further include PSTN nodes (i.e., nodes that are maintained by third-party communication providers), PBX nodes (i.e., nodes that are connected to a PBX), central processing units, such as, the electronic circuitry within a computing device that carries out the instructions of a computer program by performing the basic arithmetic, logical, control and input/output (I/O) operations specified by the instructions. The instructions to be executed are generally kept in some kind of memory, and the like.

SD-WAN device 210, as embodied herein, can optionally have all the same or similar components as described above with reference to communication server 110 in FIG. 1. SD-WAN device 210 may additionally comprise any combination of computing components, by way of example, but in no way required or limited to, central processing units (CPUs), mass memory, buses, RAM, ROM, and other storage means (all of which are not shown for simplicity purposes). Controller 260, for purposes of this illustration, directs the overall functionality of SD-WAN device 210, as well as executes computer-readable instructions stored in memory (not illustrated), which allow SD-WAN device 210 to be any combination of single computing elements, series and pluralities of computing elements, clusters of computing elements, and primary and secondary (i.e., backup) single, series, pluralities, and clusters of computing elements, as described herein.

Additional embodiments of SD-WAN device 210 contemplate that SD-WAN device 210 comprises a series or cluster of computing elements. A cluster of computing devices, also commonly described as a service cluster, generally is a set of loosely or tightly coupled computing devices that work together in such a way they can be viewed as a single computing device. In embodiments where SD-WAN device 210 is contemplated to consist of a service cluster, it is further contemplated that SD-WAN device 210 be a collection of core and supplementary subsystems providing configuration, operation, business logic, monitoring, reporting, and system management services required to operate a complete life cycle of the SD-WAN service contemplated to be delivered via SD-WAN device 210.

In FIG. 2, network monitor 220 observes and gathers network parameters reflecting network conditions and network events and stores them to database 296. Generally, network monitor 220 comprises a computing device or cluster of computing devices that monitor (i.e., observe or watch, perceive and note and to gather or bring together or assemble from various places or sources within the network and accumulate to database 296) a network for network conditions and network events, including but not limited to response time, availability, uptime, round-trip delay, end-to-end delay, network tomography, route analytics, web server monitoring, and the like. Network monitor 220 provides SD-WAN device 210 with the ability to access transmission media and optionally can process low-level network information, responds to traffic addressed to a network address for either or both network monitor 220 or SD-WAN device 210 as a whole. In additional embodiments, the network address is contemplated to be a unique media access control (MAC) address.

Network monitor 220 can optionally observe and gather network parameters according to any observation and gather methodology or periods as determined by a system administrator. By way of example and no way in limitation, observation may occur periodically, systematically, asynchronously, synchronously, or according to any type of scheduling. A system administrator is usually a person, but in certain circumstances is contemplated to be any automated device capable of machine learning, who or which is responsible for the upkeep, configuration, and operation of a computing system, including database systems, general servers, and the like.

Network parameters are customarily defined as variable information about and defining a specific network, by way of non-limiting example, a list of communication nodes actively engaged with a network, types of communication data (i.e., data, voice, and video) which may be transmitted via links within the network, codecs operably functional within the network, criteria corresponding to or preferable for the types of communication sessions customarily traversing the network, and the like.

Network conditions, as one or more elements of network parameters, generally comprise conditions or characteristics of a network, including but not limited to network topology and route analytics. Network topology is commonly defined as the arrangement of communication nodes and network elements in a communication network. It can be used to define or describe the arrangement of various types of networks. Physical topologies refer to the placement of components and communicating devices within a network and are modeled as nodes with the connection between the devices modeled as links. There are a variety of shapes for networks, including but not limited to, ring, bus, mesh, star, and the like. Mapping the data flow between components determines the logical topology of a network, i.e., the way that signals act on the network media or the way that data passes through the network from one device to next without regard to the physical interconnection of the devices.

Route analytics, in a similar manner, also as one or more components of network parameters, comprise analysis of routing protocols and structures in meshed networks by passively listening to the routing protocol exchanges between routers for network discovery, mapping, real-time monitoring, and routing diagnostics. In this embodiment, network monitor 220, when collecting route analytics, acts as a passive router, having the same routing knowledge of other traditional network routers but without the ability to forward actual data packets. In additional embodiments, network monitor 220 is contemplated to reviews both current and historical routing information, detection of routing events, failures, or protocol anomalies impacting paths, links, or reachability, able to handle multiple protocols' routing, and the like.

Network conditions are further contemplated to include, but also not be limited to, metrics relating to packet loss, bit rate, throughput, transmission delays, jitter, the current status of traffic prioritization, services response times, data loss, signal-to-noise ratio, cross talk, echo, interruptions, frequency response, and the like.

Network events, also generically termed network occurrences, are generally network conditions that warrant modification of an otherwise optimized communication session path for a given communication session. Examples of network events include, but are not limited to, power outages, node failures, communication tower failures or damage, natural disasters impacting nodes or groups of nodes, routine or unscheduled maintenance associated with nodes, terrorist attacks, and virtually any other event or occurrence affecting an otherwise optimized communication node or route.

Additional embodiments of network monitor 220 further contemplate network monitor 220 actively collecting network tomography parameters. Network tomography, customarily, relates to a network's internal characteristics, using information derived from endpoint data, which aims to monitor the health of various links in a network in real-time. In one additional embodiment, "loss tomography" aims to find "lossy" links in a network by sending active probes from various vantage points in the network within the Internet. In contrast, in another additional embodiment, "delay tomography" aims to find link delays using end-to-end probes sent from vantage points, helping to isolate links with large queueing delays caused by congestions.

In yet still further embodiments, it is contemplated that network monitor 220 observes and gathers network parameters reflecting both or none of the network conditions and network events.

Also, as illustrated in FIG. 2, metrics collector 230 actively receives and gathers node parameters reflecting the status of nodes operatively coupled to the network, storing the node parameters to database 296. In this context, as compared to network monitor 220, metrics collector 230 receives reporting from gateways, communication nodes, other network devices, and the like (for example, gateways 170, 370, and communication nodes 180, 380 as illustrated in FIGS. 1 and 3). As such, node status data is conferred to metrics collector 230 as a recipient or destination, as compared to actively seeking and recording in the manner data is collected by network monitor 220. Metrics collector 230 is further contemplated in additional embodiments to act as a telemeter device or cluster of devices to remotely collect measurements or other data, via the automatic transmission of network and node characteristics.

Nodes, as used herein, have the same or similar characteristics to communication nodes 180, 380, as illustrated in FIGS. 1 and 3; generally, any series of IP-enabled devices that connect to a network and enable the use of communication services to initiate communication sessions. Examples include, but are not limited to, network servers, communication nodes, network edge devices, provisioning servers, route servers, media proxy servers, statistics servers, and the like. Additional examples may further include PSTN nodes (i.e., nodes that are maintained by third-party communication providers), PBX nodes (i.e., nodes that are connected to a PBX), central processing units, and the like.

Node parameters are customarily defined as variable information about and defining a specific node, series of nodes, clusters of nodes, the links connecting them, and the like. By way of non-limiting example, node parameters relate to traffic processing patterns and telemetry metrics. Similarly, there is an overlap between node parameters and network parameters. Node parameters commonly also include data relating to packet loss, bit rate, throughput, transmission delays, jitter, the current status of traffic prioritization, services response times, data loss, signal-to-noise ratio, cross talk, echo, interruptions, frequency response, and the like.

A node status can generally be any characteristics of a communication node (for example, communication nodes 180, 380, as illustrated in FIGS. 1 and 3) or any other node. By way of example and in no way in limitation, node status can be the speeds of its connections or links to the network, its security vulnerability (i.e., pending, secure, at risk, inactive, compromised, and the like), operating system uptime, availability, battery, if applicable, sensors support, authentication credentials, ports, associated location within the network, whether part of a group or root group, context awareness, location awareness, social awareness, and the like.

Further embodiments are contemplated where, in addition to node status, metrics collector 230 can optionally receive and gather reports from nodes relating to node events. Node events, in this context, can include but are not limited to a plurality of events relating to configuration, validation, node subsystems, lifecycle, and the like. In one example, node configuration events can be configuration changes initiated by a network device, in one example, SD-WAN device 210, or by a remote or local user interface or some other type of system administration or user interaction. Node validation events, similarly, may result from tiered validation requirements or proposed configuration changes initiated by a network device or by a remote or local user interface, or additionally via some other type of system administrator or user interaction. Node subsystem events may relate to interface "up/down" or other resource availability limitations or changes. Lastly, node lifecycle events can be related to device reboot, software upgrade, or other environmental changes at the mode.

In additional embodiments, it is further contemplated that reporting of these and other types of node events may interrupt traffic evaluations (as conducted by traffic manager 240) and mitigation evaluations (as conducted by policy engine 250), each as discussed more fully below, and trigger the evaluation cycle again as discussed in more detail regarding step 416 as detailed in FIG. 4.

Yet still, additional embodiments contemplate that metrics collector 230 receives its node data and optionally other network data via a tunnel or a plurality of tunnels (in one example, tunnels 372 as illustrated in FIG. 3), via one or more gateways (in one example, gateways 170, 370 as illustrated in FIGS. 1 and 3), as explained in reference to FIG. 3.

FIG. 2 further illustrates traffic manager 240, which performs a traffic evaluation on the network parameters and the node parameters which it retrieves from database 296 to identify if a network traffic level is within a performance range. The traffic evaluation results in the creation of an analysis. Traffic manager 240 is generally a "quality of service" (QoS) element which comprises requirements on all the aspects of the connection to a network by SD-WAN device 210, including but not limited to applying traffic level and performance range business rules which relate to service response time, loss, signal-to-noise ratio, crosstalk, echo, interrupts, frequency response, loudness levels, and the like. Further embodiments contemplate where traffic manager 240 applies traffic level and performance range business rules, which further relate to "grade of service" (GoS) requirements, which comprises aspects of a connection relating to capacity and coverage of a network, in non-limiting examples guaranteed maximum blocking probability and outage probability.

Traffic manager 240 may optionally perform traffic evaluations periodically, systematically, asynchronously, synchronously, or according to any type of scheduling.

Traffic manager 240 can also optionally apply traffic level, and performance range business rules, which relate to traffic prioritization and resource reservation control mechanisms rather than the achieved service quality. In this manner, traffic manager 240 may provide different priority to different applications, users, or data flows in use at monitored nodes or to guarantee a certain level of performance to a data flow. In one non-limiting example, a required bit rate, delay, delay variation, packet loss, or bit error rates may be guaranteed.

Traffic manager 240 conducts a traffic evaluation by further weighing and assigning variable values to a series of service and network factors to determine if they are within the parameters of a "traffic level" and a "performance range," as generally defined within the business rules by a system administrator. In networks where communication sessions are comprised of packets, often called "packet-switched networks," system optimization and quality of service are affected by various factors to which business rules may be created with levels and ranges of allowable factors, which can be divided into human and technical factors. Human factors include the stability of service quality, availability of service, waiting times, and user information. These human factors are also commonly termed "service factors." Technical factors, also known as "network factors," include but are not limited to reliability, scalability, effectiveness, maintainability, network congestion, and the like.

Many circumstances can impact packets as they travel from origin to destination, including but not limited to, throughput or goodput, packet loss, errors, latency, packet delay variation, out-of-order delivery, and the like. Due to varying load from disparate users sharing the same network resources, the maximum throughput that may be provided to a certain data stream or data flow may be too low for real-time multimedia services. A network may fail to deliver (i.e., drop) some packets due to network congestion. The receiving application may ask for this information to be retransmitted, possibly resulting in congestive collapse or unacceptable delays in the overall transmission. Sometimes packets are corrupted due to bit errors caused by noise and interference, especially in wireless communications and long copper wires. A receiving node is frequently tasked with detecting this and, just as if the packet was dropped, asking for this information to be retransmitted. It might take a long time for each packet to reach its destination due to hold up in long queues.

In some cases, excessive latency can render an application such as VoIP or online gaming unusable. Packets from one source node may reach the destination node with different delays. A packet's delay varies with its position in the queues of the routers along the path between the source node and the destination node, and this position can vary unpredictably. Delay variation can be absorbed at the receiver but in so doing increases the overall latency for the stream. When a collection of related packets is routed through a network, different packets may take different routes, each resulting in a different delay. The result is that the packets arrive in a different order than they were sent. This problem requires special additional protocols for rearranging out-of-order packets. The reordering process requires additional buffering at the receiver, and as with packet delay, variation increases the overall latency for the stream.

Business rules comprise an instruction or set of instructions or specific criteria indicating one or more actions to be taken concerning optimizing communication sessions for a given node or nodes, and/or obtaining information that enables optimization of network links and thereby communication sessions. In one aspect, business rules define the information needed to optimize the certain quality of service factors, such as those described above, ways to obtain such information, how to process such information, path, and node ranking methodologies, and include other similar types of information. Such actions dictated by business rules may be associated with the satisfaction of a set of network parameters, network conditions, network events, node parameters, node status, node events, and the like. Business rules generally include conditions and corresponding actions but may include a variety of conditions and sets of actions. Business rules are generally predetermined and created by system administrators or system users, or created on the fly by proprietary learning algorithms operating within a system, and the like.

In applying business rules as part of the traffic evaluation, traffic manager 240 determines a network traffic level. The network traffic level can be based on any combination of service factors and technical factors, and frequently includes but is not limited to, a bandwidth requirement, a maximum tolerable packet loss rate, one or more allowable applications, number of active nodes simultaneously engaged in communication sessions, a maximum tolerable delay in voice data transfers, a maximum tolerable jitter, a minimum video frame rate, allowable geographical locations of intermediate nodes, and the like.

Multimedia traffic streams often have high bandwidth requirements. In non-optimized Internet, there is no mechanism for communication sessions, programs, nodes, and applications to reserve network resources to meet such high bandwidth requirements and also does not prevent anyone from sending data at such high rates. Uncontrolled transmissions at such high rates can cause heavy congestion in the network, leading to a congestion collapse that can completely halt the Internet. Setting a range of allowable bandwidth usage allows for resource allocation at traffic manager 240. Packet loss is closely associated with quality of service considerations. The amount of packet loss that is acceptable depends on the type of data being sent. For example, for VoIP traffic, missing a small percentage of packets will not affect the quality of the conversation. In another non-limiting example, losses between 5% and 10% of the total packet stream will affect the quality significantly.

On the other hand, when transmitting a text document or web page, a single dropped packet could result in losing part of the file, which is why a reliable delivery protocol is necessary for this purpose (to retransmit dropped packets). Setting an allowable constraint at traffic manager 240 on the types of programs and applications that a node or target node may be running may optimally reduce bandwidth intensity or node processing intensity. Latency in telephone calls is sometimes referred to as mouth-to-ear delay or quality of experience (QoE). Voice quality is measured according to the International Telecommunication Union (ITU) model; measurable quality of a call degrades rapidly where the mouth-to-ear delay latency exceeds 200 milliseconds.

Jitter can be quantified in the same terms as all time-varying signals, e.g., root mean square (RMS), or peak-to-peak displacement. Also, like other time-varying signals, jitter can be expressed in terms of spectral density. The jitter period is the interval between two times of maximum effect (or minimum effect) of a signal characteristic that varies regularly with time. Jitter frequency, the more commonly quoted figure, is its inverse. ITU-T G.810 classifies jitter frequencies below 10 Hz as wander and frequencies at or above 10 Hz as jitter. Jitter may be caused by electromagnetic interference and crosstalk with carriers of other signals. Jitter can cause a display monitor to flicker, affect the performance of processors in personal computers, introduce clicks or other undesired effects in audio signals, and cause loss of transmitted data between network devices. The amount of tolerable jitter depends on the affected application. Frame rate greatly impacts the style and viewing experience of a video. Different frame rates yield different viewing experiences, and choosing a frame rate commonly means choosing between things such as how realistic you want your video to look, or whether or not you plan to use techniques such as slow-motion or motion blur effects. For example, movies are usually displayed at 24 frames per second (fps), since this frame rate is similar to how we see the world, and creates a very cinematic look. The video that is being broadcast live or video with a lot of motion, such as a sporting event or video game recording, will often have a higher frame rate, a higher frame rate keeps the motion smooth and the details crisp.

In setting an allowable constraint on jitter frequency as part of applying business rules as part of the traffic evaluation, traffic manager 240 determines a performance range. The performance range can be based on any combination of network performance factors, including but not limited to comparison and evaluation against real-time and forecasted traffic graphs, pre-configured or on the fly proprietary learning algorithms relating to traffic matching rules to localize and aggregate local IP address(es), remote IP address(es), port number(s) or protocol(s), bandwidth quotas, traffic shaping or rate-limiting, context filtering, and the like.

Real-time traffic graphs commonly update continuously but systematically, in a generally predetermined manner customarily created by system administrators or optionally created on the fly by proprietary learning algorithms operating within the system. Forecasted traffic graphs generally contain modeled information based on historical data, in one non-limiting example, as observed by network monitor 220 and received by metrics collector 230. Traffic graphs generally categorize traffic by applications, interfaces, protocols, and hosts to generate visibility into bandwidth usage.

From its traffic evaluation, traffic manager 240 creates an analysis of the network and the operatively coupled nodes. Other elements of SD-WAN device 210 may use this analysis for further evaluation, such as policy engine 250. The analysis data provides essential features, relational data, and a recommendation of which of the mitigation strategies (as discussed below) can be initiated by SD-WAN device 210.

FIG. 2 further illustrates policy engine 250, which performs a mitigation evaluation on the analysis created by traffic manager 240, to determine if a mitigation strategy must be initiated.

Policy engine 250 may optionally perform mitigation evaluations periodically, systematically, asynchronously, synchronously, or according to any scheduling.

Policy engine 250 allows a system administrator or a proprietary learning algorithm to create, monitor, and enforce rules about how network resources and data can be processed or distributed. As noted above, policy engine 250 relies on a combination of collected and stored data, such as, for example, data observed by network monitor 220, data received by metrics collector 230, and analyses created by traffic manager 240. Policy engine 250 further relies on business rules based on several factors to determine whether or not one or more mitigation strategies need to be initiated.

Generally, a mitigation evaluation is conducted to determine if network conditions or consequences of increased data flow need to be made less severe, lessening the force or intensity of jitter, latency, bandwidth usage, and the like.

In its mitigation evaluation process, policy engine 250 uses the output data of the analysis created by traffic manager 240 to compare currently utilized resources and if resource utilization, in one example, has decreased compared to a previous iteration of evaluation. In this non-limiting example, one mitigation strategy would be to release resources back to a common resource pool if decreased usage is observed, to allow more resources to be made available to lower priority communication sessions or application tasks, due to previous network conditions, network events, node status, node events, and the like. In additional embodiments, it is further contemplated that policy engine 250 performs the mitigation evaluations on network parameters and node parameters directly, in place of or additionally to performing the mitigation evaluations on traffic manager 240's resultant analysis.

Policy engine 250 may also pull from database 296 a list of mitigation strategies, in one example, to evaluate the costs associated with each mitigation strategy if it were to be applied to the currently evaluated node. Costs, as used by policy engine 250, may optionally be predetermined, static values based on historic network or system information as determined by a system administrator, or optimally would be observed values based on patterns and behaviors observed by network monitor 220, received by metrics collector 230, and evaluated by traffic manager 240.

Policy engine 250 optionally may further evaluate the available mitigation strategies based on current network conditions, current network events, current node status, and current node events, as collected or reported. As noted above, certain triggering node events as reported by gateways or nodes operably coupled to the network may interrupt traffic manager 240's traffic evaluation based on the severity of the node event, and trigger mitigation evaluation at policy engine 250, based directly on network parameters and node parameters, in place of or optionally additionally to performing the mitigation evaluations on traffic manager 240's resultant analysis.

Upon comparison to current network conditions, current network events, current node status, and current node events, as collected or reported, policy engine 250 can determine a list of eligible mitigation strategies. In additional embodiments, it is further contemplated that policy engine 250 will further evaluate the list of available mitigation strategies not to overload one or more nodes (i.e., the node or another target node). Such further evaluation, in one non-limiting example, could be based on a combination of cost observed for the particular node in conjunction with the node status.

Additional detail on policy engine 250 mitigation evaluation will be described in reference to FIG. 4.

As used by policy engine 250, mitigation strategies are generally steps taken to reduce risk, condition, consequence, force, or intensity of network and node circumstances, i.e., reducing the severity of the impact or the probability of the occurrence of network conditions, network events, and node events. Mitigation strategies are generally composed of, but not limited to, values defining how many cycles the mitigation strategy must be active until it can be reevaluated, its impact on the central processing units of nodes or target nodes, its impact on memory or RAM of nodes or target nodes, its impact on network bandwidth, a priority of the mitigation strategy compared to other mitigation strategies configured for the same system, configuration for uplinks affected by the mitigation strategy, arrays of actions to be emitted in a certain mitigation strategy is selected, a list of network conditions which when met make the mitigation strategy eligible for evaluation, and the like.

If policy engine 250 determines that at least one mitigation strategy must be initiated based on the mitigation evaluation, policy engine 250 determines a target node or nodes to receive the mitigation strategy. Elements of this "determination" are determining a format understandable to the target node and translating the mitigation strategy into that format and pushing the translated mitigation strategy to the target node.

Target nodes, as delineated in this specification and the claims, have the same or similar qualities to any other communication node referenced in this specification and the claims, i.e., any type of IP-enabled device that connects to a network and enables communication sessions. Nonlimiting examples include network edge devices, provisioning servers, route servers, media proxy servers, statistics servers, and the like.

Policy engine 250 uses a metalanguage to describe the mitigation strategies, generic formats that can be adopted when creating application specific-languages without having to reinvent syntax. These generic meta formats can be processed by generic tools and languages, which then can be understood by those applications (or nodes) using the meta format. Examples of metalanguages include, but are not limited to, XML, RDF, JSON, and the like. Encapsulation of meta format commands associated with tunneling will be described in more detail concerning tunnels 372 illustrated in FIG. 3.

Additional embodiments are further contemplated where if policy engine 250 determines that the mitigation strategy must be initiated, that commands will only be pushed to a target node. Yet further additional embodiments are contemplated where commands would be pushed to either or both of a target node and a second node.

As further illustrated in FIG. 2, database 296 can generally be defined as an organized collection of data, generally stored and accessed electronically from a computing system. One way to classify databases, such as database 296, involves the type of their contents, for example, bibliographic, document-text, statistical, or multimedia objects. Another way is by their application area, for example, accounting, music compositions, movies, banking, manufacturing, or insurance. A third way is by some technical aspects, such as the database structure or interface type. Non-limiting examples of databases may include, but are not limited to in-memory, active, cloud, a data warehouse, deductive, document, embedded, federated, graph, array, hypertext or hypermedia, knowledge base, mobile, operational, parallel, shared memory architecture, shared-disk architecture, shared-nothing architecture, probabilistic, real-time, spatial, temporal, terminology-oriented, unstructured, and the like.

As illustrated in FIG. 2, controller 260 can commonly be defined in the industry as, for example, a chip, an expansion card, or a stand-alone device that interfaces with the networked or peripheral device. This link may be between two parts of a computer (for example, a memory controller that manages access to memory or a stored database, in one example, database 296) or a controller on an external device that manages the operation of (and connection with) that device. Controller 260 can optionally be defined in the opposite sense to refer to a device by which a user controls the operation of the computer as an "in-game" controller. In certain computing environments, the controller may be a plug-in board, a single integrated circuit on the motherboard, or an external device. In other computing environments, the controller is usually either a separate device attached to a channel or integrated into the peripheral.

Controller 260 can further comprise an operating system 262 and a coupler 264.

Operating system 262 can, via a network connection, direct and control the operation and function of SD-WAN device 210. Operating system 262 or the central processing unit (CPU) is the electronic circuitry within SD-WAN device 210 that carries out the basic operating instructions of SD-WAN device 210 by performing the basic arithmetic, logical, control, and input/output (I/O) operations specified by the instructions. The instructions to be executed are generally kept in some form of memory (not shown). Operating system 262 generally directs and controls by managing or guiding by instruction, etc., regulating feedback on SD-WAN device 210, and the like.

Coupler 264 can, via a network connection, operatively couple network monitor 220, metrics collector 230, traffic manager 240, policy engine 250, and database 296. Coupler 264 can be any computing device that "couples" various computing elements. In software engineering, "coupling" is generally defined as the degree of interdependence between software modules, for example, a measure of how closely connected two routines or modules are or the strength of the relationships between modules. Coupling is usually contrasted with cohesion. Low coupling often correlates with high cohesion and vice versa. Low coupling is often a sign of a well-structured computer system and a good design, and when combined with high cohesion, supports the general goals of high readability and maintainability.

Examples of coupling types include but are not limited to procedural programming, which refers to a subroutine of any kind, i.e. a set of one or more statements having a name and preferably its own set of variable names, content coupling, which occurs when one module uses the code of another module, common coupling, which occurs when several modules have access to the same set of global data, external coupling, which occurs when two modules share an externally imposed data format, communication protocol, or device interface (e.g., related to communication to external tools and devices), control coupling, or one module controlling the flow of another, by passing it information on what to do, stamp coupling also known as data-structured coupling, which occurs when modules share a composite data structure and use only parts of it (e.g., passing a whole record to a function that needs only one field of it), data coupling, something which occurs when modules share data through, for example, parameters (e.g., each datum is an elementary piece, and these are the only data shared (i.e., passing an integer to a function that computes a square root)), subclass coupling, which describes the relationship between a child and its parent (i.e., the child is connected to its parent, but the parent is not connected to the child), temporal coupling, which occurs when two actions are bundled together into one module just because they happen to occur at the same time, and the like.

FIG. 3 illustrates another exemplary embodiment, a system 300, including an SD-WAN device 310 (as described in more detail above about SD-WAN device 210 in FIG. 2). System 300 further comprises gateways 370, tunnels 372, nodes 380, and networks 390. Networks 390, as a component of this exemplary embodiment, connects SD-WAN device 310, gateways 370, nodes 380, and user devices 394. Tunnels 372, however, add an additional connection layer between gateways 370 and nodes 380. SD-WAN device 310, as embodied as a component of this exemplary embodiment, demonstrates the "software defined networking in a wide area network," as stated above in more detail in the written description associated with FIG. 2.

As contemplated by exemplary system 300 illustrated in FIG. 3, when a node 380 comes online, it receives general network configuration information from SD-WAN device 310, which includes but is not limited to peering information for gateways 370 and an initial traffic policy configuration, optionally with either or both of application definitions and policy or QoS definitions.

Gateways 370 (also generally "gateways" as discussed with reference to FIG. 1) can refer to a piece of networking hardware or clusters of networking hardware that is, including but not limited to, equipped for interfacing with another network that uses different protocols; contains computing devices such as protocol translators, impedance matching devices, rate converters, fault isolators, or signal translators as necessary to provide system interoperability to assist with establishing mutually acceptable administrative procedures between network; consists of a protocol translation or mapping application to interconnect networks with different network protocol technologies by performing the required protocol conversions. A gateway, generally, is an essential feature of most routers, although gateway devices may and frequently be standalone with specialty applications.

Gateways 370 and nodes 380, using such initial configuration information, can establish tunnels 372. A tunnel, such as, for example, tunnels 372, involves any communications protocols that allow for movement of data from one network to another, involving allowing private network communications to be sent across a public network through a process called encapsulation. Encapsulation is a method of designing modular communication protocols in which logically separated functionalities in a network are abstracted from their underlying structures by including information hiding within higher-level objects. During encapsulation, each layer builds a protocol data unit by adding a header containing control information to the service data unit (SDU) by adding a header containing control information to the SDU from a layer above. Each lower layer provides a service to the layer or layers above it, while at the same time, each layer communicates with its corresponding layer on the receiving node.

Additional embodiments of gateways 370 are contemplated where additional bandwidth measurement services are also deployed to obtain bandwidth data for initial and periodic evaluation of bandwidth available for tunnels 372.

Tunneling, via tunnels 372, involves repackaging traffic data into a different form. In one non-limiting example, tunnels 372, and its applicable protocol(s), assist SD-WAN device 310, and specifically policy engine 250 (as described above with reference to FIG. 2) with translating mitigation strategies into mitigation commands that target nodes, such as, for example, nodes 380, can understand, use, and apply. Encapsulation or adding headers to the mitigation command data packets containing the mitigation strategies is one methodology that is used by SD-WAN device 310.

In this way, SD-WAN device 310 can ensure that the data portion of the packets that comprise mitigation commands are delivered to nodes 380, carrying the packets that provide the mitigation actions required to equilibrate networks 390, and nodes 380 interactions with networks 390.

Additional embodiments are contemplated wherein tunnels 372 can also be used, in one non-limiting example, to pass through a firewall situated before nodes 380, using, for example, a protocol that the firewall would normally block but wrapped inside a protocol that the firewall normally does not block.

As generally used herein, networks 390 can be any system of interconnected computing devices, nodes, and end user devices. In one example, a network, such as networks 390, includes the Internet that is a global system of interconnected computers that use the standard Internet protocol suite to serve users worldwide with an extensive range of information resources and services.

User devices 394 can be generally defined as any type of communication endpoint, i.e., any type of communication network node. User devices 394 can be any type of interface exposed by a communicating party or by a communication channel. An example of the latter type of communication endpoint is a publish-subscribe topic or group-in-group communication systems. As is commonly understood in the field, a communication endpoint or user device is a discoverable communication node whose scope may be varied to narrow or broaden the discovery zone. Endpoints facilitate a standard programmable layer of abstraction whereby heterogeneous software systems and subsystems may communicate with each other and that the means of communication are decoupled from the communicating subsystems. Examples of user devices 394 include, but are not limited to, communication terminals, handset devices, wireless phones, desktop computers, laptop computing devices, tablets, other handheld computing devices, and the like.

User devices 394 may further comprise any electrical or electronic equipment that is connected to an IT infrastructure, and that enables or is related to electronic communications (e.g., communication sessions). Examples of these types of assets include, but are not limited to, VoIP phones, mobile phones, fax machines, conventional Plain Old Telephony System (POTS) phones, smartphones, cordless phones, conference room speaker phones, computers, Bluetooth enabled phones, laptops, audio/video conferencing equipment, electronic gaming equipment, printers, copiers, tablet computers, or more generally, any kind of network communication device.

FIG. 4 provides for an exemplary method 400 describing one embodiment of a mitigation evaluation via a policy engine of a software defined networking in a wide area network (SD-WAN) device individually and as part of the exemplary system, each as provided above in reference to FIGS. 2 and 3. Such exemplary methods combine the basic inventive concept(s) as embodied in the above SD-WAN device illustrated in FIG. 2 and the exemplary system, including an SD-WAN device depicted in FIG. 3.

Method 400 starts at 402, with the policy engine evaluating an analysis created by a traffic manager at 404. The policy engine determines if a mitigation strategy is required for a target node to be able to continue to receive communications and data, i.e., whether or not the target node is optimized for the types of communications that are available to be directed to the target node. The traffic manager, as contemplated evaluating the analysis at 404, has substantially similar aspects as to traffic manager 240, as illustrated in more detail regarding FIG. 2. The analysis data provides essential features, relational data, and a recommendation of which of the mitigation strategies (as discussed below) may or should be initiated within the system.

Generally, a mitigation strategy can be defined as a series of steps taken to reduce risk, i.e., reduce the severity of an impact or probability of an occurrence of a known risk. As it relates to this exemplary method 400 illustrated in FIG. 4, a mitigation strategy is generally composed of, but not limited to, one or more values defining how many cycles the mitigation strategy must be active until it can be reevaluated, its impact on the central processing units of nodes or target nodes, its impact on memory or RAM of nodes or target nodes, its impact on network bandwidth, a priority of the mitigation strategy compared to other mitigation strategies configured for the same system, configuration for uplinks affected by the mitigation strategy, arrays of actions to be emitted in a certain mitigation strategy is selected, a list of network conditions which when met make the mitigation strategy eligible for evaluation, and the like, all as discussed with more detail in reference to policy engine 250 illustrated in FIG. 2.

Evaluation or evaluating, as used in reference to method steps 404, 406, 410, and 412 includes but is not limited to determining value, nature, characteristic, or quality of any one or any combination of a network condition, a network parameter, a node condition, a node parameter, a node status, a node event, and the like. These value judgments, assessments, and appraisals can be any combination of functional data that a person skilled in the art of network topography and tomography would use to determine the overall status or "health" of a network and the communications components operably connected to the network. As discussed previously, a network administrator, commonly, determines the ranges and specific criteria within which a specific network will function optimally. However, additional embodiments are contemplated wherein a policy engine (such as, for example, policy engine 250 illustrated in FIG. 2) or a traffic manager (such as traffic manager 240, also illustrated in FIG. 2) can have attributes containing learning algorithms which can sample the general metrics of a given network and dynamically create ranges and specific criteria within which the network will function optimally.

In additional embodiments, the policy engine's evaluation of the analysis to determine if a mitigation strategy is required can be based on evaluating a network parameter or a node parameter. In yet still, additional embodiments, the policy engine's evaluation of the analysis to determine if a mitigation strategy is required can be based on either or both evaluating a network parameter and evaluating a node parameter.

Network parameters are customarily defined as variable information about and defining a specific network, by way of non-limiting example, a list of communication nodes actively engaged with a network, types of communication data (i.e., data, voice, and video) which may be transmitted via links within the network, codecs operably functional within the network, criteria corresponding to or preferable for the types of communication sessions customarily traversing the network, and the like. Node parameters are customarily defined as variable information about and defining a specific node, series of nodes, clusters of nodes, the links connecting them, and the like.

In further additional embodiments, the node parameter can optionally reflect a node status or a node event. A node status can generally be any characteristics of a communication node (for example, communication nodes 180, 380, as illustrated in FIGS. 1 and 3) or any other node. By way of example and in no way in limitation, node status can be the speeds of its connections or links to the network, its security vulnerability (i.e., pending, secure, at risk, inactive, compromised, and the like), operating system uptime, availability, battery, if applicable, sensors support, authentication credentials, ports, associated location within the network, whether part of a group or root group, context awareness, location awareness, social awareness, and the like. Node events, in this context, can include but are not limited to a plurality of events relating to configuration, validation, node subsystems, lifecycle, and the like. In one example, node configuration events can be configuration changes initiated by a network device, in one example, SD-WAN device 210, or by a remote or local user interface or some other type of system administration or user interaction.

At 406 the policy engine compares one or more of a currently utilized resource within the network to which the policy engine and the target node are operatively coupled to determine as a threshold mitigation strategy if a rollback of the one or more currently utilized resource will fully satisfy the evaluation of the analysis. Network resources are generally defined as the component parts of a network's infrastructure, which includes but is not limited to, by way of non-limiting examples, switches, routers, VLAN, DNS, IP addresses, nodes, and the like. A rollback, in data and network management, is an operation that returns a network from its current state to a previous state. As is contemplated by this exemplary method 400, a policy engine or a traffic manager (in additional embodiments), once a network condition is determined to have occurred and that a mitigation strategy must be implemented, the first mitigation strategy attempted will be to attempt a rollback of the network condition to a previous condition. However, in many instances, a rollback will not solve a network event or condition, which requires additional mitigation strategies to be available to a policy engine or traffic manager, based on the available resources currently or optimally utilized within a network.

As such, at 408, the policy engine engages in retrieving from a database a list of available mitigation strategies where the rollback of the one or more currently utilized resources does not satisfy the evaluation of analysis. At 410, the policy engine thereafter evaluates the list of available mitigation strategies based on a network parameter to determine a list of eligible mitigation strategies and also to determine a cost. As contemplated in this exemplary method 400, the database from which the policy engine retrieves the list of available mitigation strategies can generally be defined as an organized collection of data, generally stored and accessed electronically from a computer system. One way to classify databases, such as database 296, as illustrated in FIG. 2, involves the type of their contents, for example, bibliographic, document-text, statistical, or multimedia objects. Examples of databases may include but are not limited to in-memory, active, cloud, a data warehouse, deductive, document, embedded, federated, graph, array, hypertext or hypermedia, knowledge base, mobile, operational, parallel, shared memory architecture, shared-disk architecture, shared-nothing architecture, probabilistic, real-time, spatial, temporal, terminology-oriented, unstructured, and the like.

The availability of mitigation strategies, in additional embodiments, is contemplated to be predetermined by a network administrator or a network user. In further embodiments, the list of available mitigation strategies may be created on the fly by proprietary learning algorithms operating within the network, and the like. In yet further embodiments, the policy engine can optionally determine the list of available and eligible mitigation strategies by further evaluating the list of available mitigation strategies to determine a cost and based on a network parameter or a node parameter. Still, additional embodiments contemplate where the determination is based on either or both of the network parameter and the node parameter.

Costs may optionally be predetermined, static values based on historic network or system information as determined by a system administrator, or optimally would be observed values based on patterns and behaviors observed by a network monitor, for example, network monitor 220 as illustrated in FIG. 2. Additional embodiments are contemplated where once a network monitor (i.e., network monitor 220) observes a pattern of behavior, this data is received by a metrics collector (such as, for example, metrics collector 230 depicted in FIG. 2) and thereafter evaluated by a traffic manager (i.e., traffic manager 240 of FIG. 2) to ascertain a cost.

At 412, the policy engine further evaluates the list of eligible mitigation strategies based on the various collected data, including but not limited to the cost, the network parameter, and the node parameter to create a priority list. As contemplated in this exemplary method 400, the priority list is prioritized by a lowest cost and a highest impact on the network parameter or the node parameter, at the discretion as predetermined by a network administrator, or optionally, in additional embodiments determined on the fly by proprietary learning algorithms operating within the network, and the like.

In further embodiments, in creating the priority list, the priority list can be optionally prioritized by a learning algorithm which determines the cost based on a pattern of behavior in a network, optimally but not required to reevaluate the network parameter and the node parameter based on this pattern of behavior within the network.

At 414, the policy engine engages in selecting from the priority list at least one, one or more, or more than one mitigation strategy. As contemplated in this exemplary method 400, the selected mitigation strategy would have a highest priority. In additional contemplated embodiments, selecting from the priority list can be based on a proprietary learning algorithm determining a best priority based on a pattern of behavior within the network.

At 416, the policy engine sends out a mitigation command containing the mitigation strategy. As further contemplated as inherent to this exemplary method 400, the policy engine (i.e., policy engine 250 as described above in FIG. 2) translates the mitigation strategies into mitigation commands that target nodes, such as, for example, nodes 380 as illustrated in FIG. 3, can understand, use, and apply. Encapsulation or adding headers to the mitigation command data packets containing the mitigation strategies is one methodology that is used by the policy engine to ensure timely and functional delivery. In this way, the policy engine can ensure that the data portion of the packets that comprise mitigation commands be delivered to target nodes do carry the packets that provide the mitigation actions required to equilibrate a network and its parameters, conditions, or events with the target node.

Thereafter, method 400 restarts at 402.

Additional methods, aspects, and elements of the present inventive concept are contemplated to be used in conjunction with, individually or in any combination thereof, which will create a reasonably functional software defined networking in a wide area network (SD-WAN) device, system, and method for mitigation evaluation. It will be apparent to one of ordinary skill in the art that the manner of making and using the claimed invention has been adequately disclosed in the above-written description of the exemplary embodiments and aspects. It should be understood, however, that the invention is not necessarily limited to the specific embodiments, aspects, arrangement, and components shown and described above, but may be susceptible to numerous variations within the scope of the invention.

Moreover, particular exemplary features described herein in conjunction with specific embodiments or aspects of the present invention are to be construed as applicable to any embodiment described within, enabled through this written specification and claims, or apparent based on this written specification and claims. Thus, the specification and drawings are to be regarded in a broad, illustrative, and enabling sense rather than a restrictive one. It should be understood that the above description of the embodiments of the present invention is susceptible to various modifications, changes, and adaptations, and the same are intended to be comprehended within the meaning and range of equivalents of the appended claims.

The invention claimed is:

1. A software defined networking in a wide area network (SD-WAN) device, comprising a memory storing computer executable instructions implemented via a processor, executing software defined networking in a wide area, further comprising:
 a network monitor, wherein the network monitor observes and gathers via a network an at least one network reflecting an at least one network condition and stores the at least one network parameter to a database;
 a metrics collector, wherein the metrics collector receives and gathers via the network an at least one node parameter reflecting an at least one status of an at least one node operatively coupled to the network and stores the at least one node parameter to the database;
 a traffic manager, wherein the traffic manager performs a traffic evaluation on the at least one network parameter or the at least one node parameter to identify if a network traffic level is within a performance range creating an at least one analysis;
 a policy engine, wherein the policy engine performs a mitigation evaluation on the at least one analysis to determine if an at least one mitigation strategy must be initiated, wherein the mitigation evaluation further comprises evaluating a list of available mitigation strategies and determining from it a list of at least one eligible mitigation strategy and evaluating the list of the at least one eligible mitigation strategy based on a cost and the at least one node parameter;
 whereby, if the policy engine determines that the at least one mitigation strategy must be initiated, the policy engine determines an at least one target node to receive the at least one mitigation strategy and translates the at least one mitigation strategy into a format understandable to the at least one target node and pushes an at least one mitigation command containing the translated at least one mitigation strategy to the at least one target node; and
 a controller, further comprising:
   an operating system, wherein, via the network, the operating system directs and controls the operation and function of the SD-WAN device; and
   a coupler, wherein, via the network, the coupler operatively couples the network monitor, the metrics collector, the traffic manager, the policy engine, the database, and the operating system.

2. The SD-WAN device of claim 1, wherein the at least one network parameter reflects the at least one network condition or an at least one network event.

3. The SD-WAN device of claim 1, wherein the at least one network parameter reflects the at least one network condition and an at least one network event.

4. The SD-WAN device of claim 1, wherein the metrics collector receives and gathers the at least one node parameter via a tunnel between an at least one gateway cluster and the at least one node.

5. The SD-WAN device of claim 1, wherein the at least one node parameter reflects the at least one status of the at least one node or an at least one node event.

6. The SD-WAN device of claim 1, wherein the at least one node parameter reflects the at least one status of the at least one node and an at least one node event.

7. The SD-WAN device of claim 1, wherein the traffic manager performs the traffic evaluation on the at least one network parameter and the at least one node parameter.

8. The SD-WAN device of claim 1, wherein the traffic evaluation further comprises applying an at least one business rule relating to an at least one service factor or an at least one network factor constraining a maximum traffic level and a minimum traffic level required to maintain a network configuration at its current status.

9. The SD-WAN device of claim 1, wherein the traffic evaluation further comprises applying an at least one business rule relating to an at least one service factor and an at least one network factor constraining a maximum traffic level and a minimum traffic level required to maintain a network configuration at its current status.

10. The SD-WAN device of claim 1, wherein the network traffic level further comprises at least one of a bandwidth requirement, a maximum tolerable packet loss rate, a maximum of active nodes simultaneously engaged in the network, a maximum tolerable delay, a maximum tolerable jitter, or a minimum video frame rate.

11. The SD-WAN device of claim 1, wherein the network traffic level further comprises a bandwidth requirement, a maximum tolerable packet loss rate, a maximum of active nodes simultaneously engaged in the network, a maximum tolerable delay, a maximum tolerable jitter, and a minimum video frame rate.

12. The SD-WAN device of claim 1, wherein the performance range further comprises a forecasted traffic graph.

13. The SD-WAN device of claim 1, wherein the performance range further comprises a real-time traffic graph.

14. The SD-WAN device of claim 1, wherein the at least one analysis further comprises the traffic evaluation of the at least one network parameter or the at least one node parameter.

15. The SD-WAN device of claim 1, wherein the at least one analysis further comprises the traffic evaluation of the at least one network parameter and the at least one node parameter.

16. The SD-WAN device of claim 1, wherein the mitigation evaluation further comprises evaluating a list of available mitigation strategies and determining from it a list of at least one eligible mitigation strategy.

17. The SD-WAN device of claim 1, wherein the at least one mitigation strategy further comprises an at least one array of actions to be translated if the at least one mitigation strategy is selected.

18. The SD-WAN device of claim 1, wherein if the policy engine determines that the at least one mitigation strategy must be initiated and the at least one target node is the at least one node.

19. The SD-WAN device of claim 1, wherein if the policy engine determines that the at least one mitigation strategy must be initiated and the least at one target node is an at least one second node.

20. A system, comprising:
an at least one gateway;
an at least one node;
a software defined networking in a wide area network (SD-WAN) device, comprising a memory storing computer executable instructions implemented via a processor, executing software defined networking in a wide area, further comprising:
  a network monitor, wherein the network monitor observes and gathers an at least one network parameter reflecting an at least one network condition and stores the at least one network parameter to a database;
  a metrics collector, wherein the metrics collector receives and gathers an at least one node parameter reflecting an at least one status of the at least one node and stores the at least one node parameter to the database;
  a traffic manager, wherein the traffic manager performs a traffic evaluation on the at least one network parameter or the at least one node parameter to identify if a network traffic level is within a performance range creating an at least one analysis;
  a policy engine, wherein the policy engine performs a mitigation evaluation on the at least one analysis to determine if an at least one mitigation strategy must be initiated, wherein the mitigation evaluation further comprises evaluating a list of available mitigation strategies and determining from it a list of at least one eligible mitigation strategy and evaluating the list of the at least one eligible mitigation strategy based on a cost and the at least one node parameter;
  whereby, if the policy engine determines that the at least one mitigation strategy must be initiated, the policy engine determines an at least one target node to receive the at least one mitigation strategy and translates the at least one mitigation strategy into a format understandable to the at least one target node and pushes an at least one mitigation command containing the translated at least one mitigation strategy to the at least one target node; and
  a controller, further comprising:
    an operating system, wherein the operating system directs and controls the operation and function of the SD-WAN device; and
    a coupler, wherein the coupler operatively couples the network monitor, the metrics collector, the traffic manager, the policy engine, the database, and the operating system;
a network, wherein the network connects the at least one gateway, the at least one node, and the SD-WAN device via the controller.

21. The system of claim 20, wherein the at least one gateway and the at least one node is further coupled via an at least one tunnel.

22. The system of claim 20, wherein the at least one network parameter reflects the at least one network condition or an at least one network event.

23. The system of claim 20, wherein the at least one network parameter reflects the at least one network condition and an at least one network event.

24. The system of claim 20, wherein the metrics collector receives and gathers the at least one node parameter via a tunnel between an at least one gateway cluster and the at least one node.

25. The system of claim 20, wherein the at least one node parameter reflects the at least one status of the at least one node or an at least one node event.

26. The system of claim 20, wherein the at least one node parameter reflects the at least one status of the at least one node and an at least one node event.

27. The system of claim 20, wherein the traffic manager performs the traffic evaluation on the at least one network parameter and the at least one node parameter.

28. The system of claim 20, wherein the traffic evaluation further comprises applying an at least one business rule relating to an at least one service factor or an at least one network factor constraining a maximum traffic level and a minimum traffic level required to maintain a network configuration at its current status.

29. The system of claim 20, wherein the traffic evaluation further comprises applying an at least one business rule relating to an at least one service factor and an at least one network factor constraining a maximum traffic level and a minimum traffic level required to maintain a network configuration at its current status.

30. The system of claim 20, wherein the network traffic level further comprises at least one of a bandwidth requirement, a maximum tolerable packet loss rate, a maximum of active nodes simultaneously engaged in the network, a maximum tolerable delay, a maximum tolerable jitter, or a minimum video frame rate.

31. The system of claim 20, wherein the network traffic level further comprises a bandwidth requirement, a maximum tolerable packet loss rate, a maximum of active nodes simultaneously engaged in the network, a maximum tolerable delay, a maximum tolerable jitter, and a minimum video frame rate.

32. The system of claim 20, wherein the performance range further comprises a forecasted traffic graph.

33. The system of claim 20, wherein the performance range further comprises a real-time traffic graph.

34. The system of claim 20, wherein the at least one analysis further comprises the traffic evaluation of the at least one network parameter or the at least one node parameter.

35. The system of claim 20, wherein the at least one analysis further comprises the traffic evaluation of the at least one network parameter and the at least one node parameter.

36. The system of claim 20, wherein the mitigation evaluation further comprises evaluating a list of available mitigation strategies and determining from it a list of at least one eligible mitigation strategy.

37. The system of claim 20, wherein the at least one mitigation strategy further comprises an at least one array of actions to be translated if the at least one mitigation strategy is selected.

38. The system of claim 20, wherein if the policy engine determines that the at least one mitigation strategy must be initiated and the at least one target node is the at least one node.

39. The system of claim 20, wherein if the policy engine determines that the at least one mitigation strategy must be initiated and the at least one target node is an at least one second node.

40. A method for mitigation evaluation via a policy engine of a software defined networking in a wide area network (SD-WAN) device, comprising a memory storing computer executable instructions implemented via a processor, executing software defined networking in a wide area, further comprising:
 evaluating an at least one analysis created by a traffic manager to determine if an at least one mitigation strategy is required for a target node;
 comparing one or more of a currently utilized resource within a network to which the policy engine is operatively coupled to determine as a threshold mitigation strategy if a rollback of the one or more currently utilized resource will fully satisfy the evaluation of the analysis;
 retrieving from a database a list of an at least one available mitigation strategy where the rollback of the one or more currently utilized resource does not satisfy the evaluation of the at least one analysis;
 evaluating the list of the at least one available mitigation strategy based on an at least one network parameter to determine a list of an at least one eligible mitigation strategy and to determine a cost, wherein determining a list of at least one eligible mitigation strategies is based on evaluating the list of at least one available mitigation strategies to determine a cost and based on an at least one network parameter and an at least one node parameter;
 further evaluating the list of the at least one eligible mitigation strategy based on the cost, the at least one network parameter, and an at least one node parameter to create a priority list, whereby the priority list is prioritized by a lowest cost and a highest impact on the at least one network parameter or the at least one node parameter; and
 selecting from the priority list an at least one initiated mitigation strategy having a highest priority.

41. The method of claim 40, wherein evaluating the at least one analysis to determine if an at least one mitigation strategy is based evaluating an at least one network parameter or an at least one node parameter.

42. The method of claim 40, wherein evaluating the at least one analysis to determine if an at least one mitigation strategy is based on evaluating an at least one network parameter and an at least one node parameter.

43. The method of claim 40, wherein the at least one network parameter reflects an at least one network condition or an at least one network event.

44. The method of claim 40, wherein the at least one node parameter reflects an at least one node status or an at least one node event.

45. The method of claim 40, wherein determining a list of at least one eligible mitigation strategies is based on evaluating the list of at least one available mitigation strategies to determine a cost and based on an at least one network parameter or an at least one node parameter.

46. The method of claim 40, wherein in creating the priority list, the priority list is prioritized by a proprietary learning algorithm which determines the cost based on a pattern of behavior in a network and reevaluates an at least one network parameter and the at least one node parameter based on the pattern of behavior in the network.

47. The method of claim 40, wherein selecting from the priority list is based on a proprietary learning algorithm determining a best priority based on a pattern of behavior in the network.

* * * * *